No. 842,159. PATENTED JAN. 29, 1907.
G. W. ABERNETHY.
COTTON CULTIVATOR.
APPLICATION FILED NOV. 13, 1906.
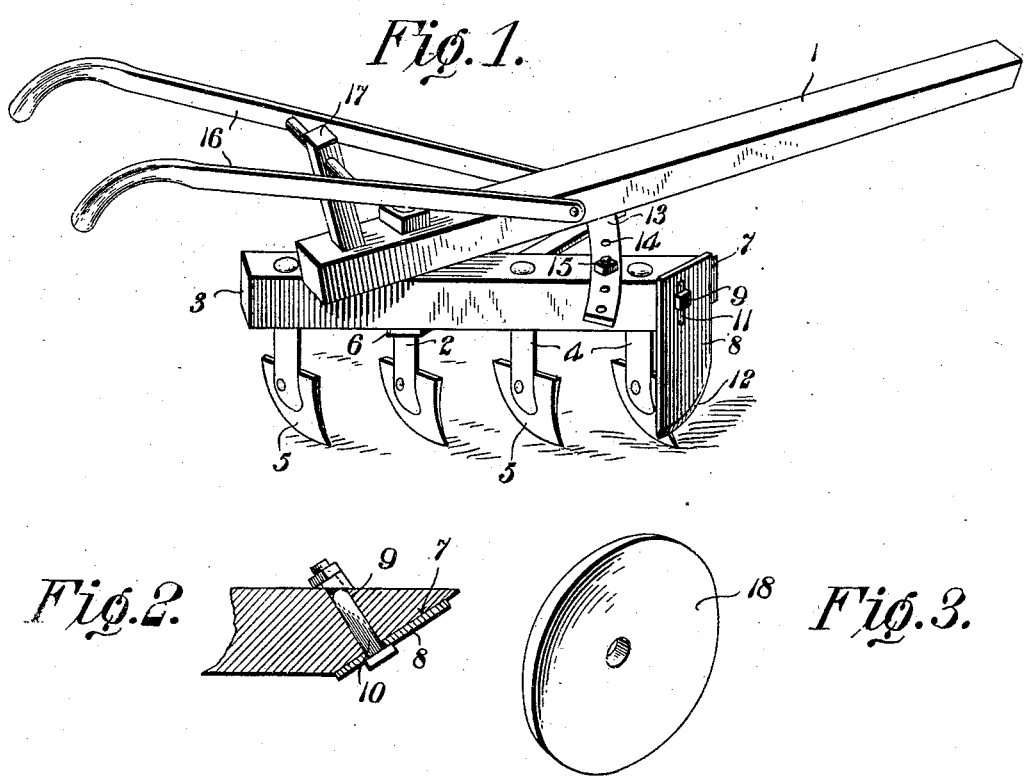

UNITED STATES PATENT OFFICE.

GEORGE W. ABERNETHY, OF LOWELL, NORTH CAROLINA.

COTTON-CULTIVATOR.

No. 842,159.      Specification of Letters Patent.      Patented Jan. 29, 1907.

Application filed November 13, 1906. Serial No. 343,222.

*To all whom it may concern:*

Be it known that I, GEORGE W. ABERNETHY, a citizen of the United States, residing at Lowell, in the county of Gaston and State of North Carolina, have invented a new and useful Cotton-Cultivator, of which the following is a specification.

This invention relates to cotton-cultivators, and has for its object to simplify the construction of devices of this character and to so arrange the parts as to enable the cultivator to be drawn close to a row of small plants without danger of covering or injuring said plants.

With these and other objects in view the invention consists of certain novel features of construction and combinations of parts, which will be hereinafter more fully described, and pointed out in the claim.

In the accompanying drawings is shown the preferred form of the invention.

In said drawings, Figure 1 is a perspective view of the cultivator. Fig. 2 is an enlarged horizontal section through one end of the adjustable beam and through the fender connected thereto, and Fig. 3 is a detail view of a modified form of fender.

Referring to the figures by characters of reference, 1 is a beam, having a standard 2, extending downward from the rear portion thereof and constituting the pivot of a cross-beam 3, to which a series of standards 4 are connected, each of these standards, as well as the standard 2, carrying a shovel or point 5. A brace-strip 6 is secured to the lower face of the beam 1, and the standard 2 extends through one end of this strip. One end of the beam 3 is beveled, as shown at 7, and a blade 8 is fastened thereon by means of a bolt 9. This bolt has an angular portion 10, which is seated within a slot 11, formed within the blade, and by tightening the bolt within the end of the beam 3 the blade 8 can be secured in any position to which it may be adjusted vertically. The angular portion 10 of the bolt projects into the beam so as to prevent the bolt from rotating, and this angular portion also prevents the blade from turning upon the bolt. The forward or advancing edge of the blade is curved downward and rearwardly, as shown at 12, and is sharpened. This blade is located close to one of the shovels 5 and constitutes a fender, inasmuch as it permits the cultivator to be drawn close to a row of plants without danger of any of the plants becoming covered. The beam 3 can be adjusted to any desired angle in relation to the beam 1, there being a curved brace-strip 13, which is secured to the beam 1 and extends over the beam 3. This base-strip has a plurality of openings 14, any one of which is adapted to receive a bolt 15 or other engaging means upon the beam 3. Handles 16 extend rearwardly from the beam 1 and are preferably supported between their ends by a standard 17, as shown.

It will be understood that when this cultivator is drawn forward the same can be disposed close to a row of small plants, and the earth upturned by the shovels will be prevented by the fender 8 from falling upon the plants. The fender is adapted to travel upon or cut slightly into the ground. Instead of using a blade 8 for a fender an ordinary disk 18 (shown in Fig. 3) may be substituted therefor, said disk serving to protect the plants from the upturned soil. It will be seen that the cultivator herein described is of very simple and durable construction, and by using the same the soil between rows of young plants can be cultivated with absolutely no danger of the plants being covered or otherwise injured.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claim.

What is claimed is—

In a cultivator the combination with a beam, a cross-beam pivotally connected thereto and having a beveled end and means for adjustably securing the beam at a desired angle to the first-mentioned beam; of a longitudinally-slotted blade upon the beveled end of the cross-beam and depending therefrom, said blade constituting a fender, and non-rotatable means secured within the cross-beam and extending through the slot for clamping the blade in adjusted position thereon, the lower end of said blade being rounded and sharpened.

In testimony that I claim the foregoing as my own I have hereto affixed my signature in the presence of two witnesses.

GEORGE W. ABERNETHY.

Witnesses:
    JOHN D. O'BRIEN,
    SLOAN SPRINGS.